(12) United States Patent
Sieutat et al.

(10) Patent No.: US 11,407,680 B2
(45) Date of Patent: Aug. 9, 2022

(54) GLASS CERAMIC ITEM WITH LIGHT DISPLAY

(71) Applicant: EUROKERA S.N.C., Chateau-Thierry (FR)

(72) Inventors: Clement Sieutat, Chateau-Thierry (FR); Pablo Vilato, Paris (FR); Adrien Beffa, Esommes sur marne (FR)

(73) Assignee: EUROKERA S.N.C., Chateau-Thierry (FR)

( * ) Notice: Subject to any disclaimer, the term of this patent is extended or adjusted under 35 U.S.C. 154(b) by 273 days.

(21) Appl. No.: 16/492,794

(22) PCT Filed: Mar. 12, 2018

(86) PCT No.: PCT/FR2018/050567
§ 371 (c)(1),
(2) Date: Sep. 10, 2019

(87) PCT Pub. No.: WO2018/167413
PCT Pub. Date: Sep. 20, 2018

(65) Prior Publication Data
US 2020/0189969 A1  Jun. 18, 2020

(30) Foreign Application Priority Data

Mar. 13, 2017 (FR) .................... 17 52034

(51) Int. Cl.
*C03C 17/00* (2006.01)
*C03C 17/25* (2006.01)
*C03C 17/30* (2006.01)
*C09D 183/04* (2006.01)

(52) U.S. Cl.
CPC .......... *C03C 17/009* (2013.01); *C03C 17/002* (2013.01); *C03C 17/007* (2013.01); *C03C 17/256* (2013.01); *C03C 17/30* (2013.01); *C09D 183/04* (2013.01); *C03C 2204/00* (2013.01); *C03C 2217/00* (2013.01); *C03C 2217/20* (2013.01); *C03C 2217/28* (2013.01); *C03C 2217/70* (2013.01); *C03C 2217/78* (2013.01); *C03C 2218/119* (2013.01)

(58) Field of Classification Search
None
See application file for complete search history.

(56) References Cited

U.S. PATENT DOCUMENTS

| | | | |
|---|---|---|---|
| 4,814,230 A * | 3/1989 | Vockler | C03C 17/30 428/428 |
| 2005/0214521 A1 | 9/2005 | Florent et al. | |
| 2005/0224491 A1 * | 10/2005 | Vilato | C03C 17/04 219/443.1 |
| 2008/0264931 A1 * | 10/2008 | Vilato | H05B 3/74 219/622 |
| 2015/0219312 A1 | 8/2015 | Llaluet et al. | |

FOREIGN PATENT DOCUMENTS

| | | | |
|---|---|---|---|
| EP | 3222594 A1 * | 9/2017 | ........... C03C 17/009 |
| FR | 3 040 768 A1 | 3/2017 | |
| WO | WO 2014/027161 A1 | 2/2014 | |

OTHER PUBLICATIONS

International Search Report dated May 18, 2018 in PCT/FR2018/050567 filed Mar. 12, 2018.

* cited by examiner

*Primary Examiner* — David Sample
(74) *Attorney, Agent, or Firm* — Element IP, PLC

(57) ABSTRACT

A glass ceramic item, intended in particular for use with at least one light source and/or at least one heating element, includes at least one substrate, such as a plate, made of glass ceramic, and having at least one light region. The substrate is coated with respect to the region with a paint consisting of at least one silicone resin and pigment(s). The content of the pigment(s) are greater than or equal to 1% and less than 10% by weight of the paint. A method for producing such an item is also included.

19 Claims, No Drawings

GLASS CERAMIC ITEM WITH LIGHT DISPLAY

The present invention relates to the field of glass-ceramics. More precisely, it relates to an article (or product) made of glass-ceramic, intended in particular to cover or receive heating elements (such as a hot plate), said article being provided with at least one zone that can be illuminated (so-called "illuminated" zone). "Glass-ceramic article" means an article based on a substrate made of glass-ceramic material (such as a ceramic hob), and said substrate may if necessary be provided with accessories or additional elements (decorative or functional) required for its intended use, and "article" may denote either the substrate alone or the substrate provided with additional equipment (for example a hot plate provided with its control panel, its heating elements, etc.). The present invention also relates to a method of producing said article.

There are several glass-ceramic products in common use, in particular ceramic hobs, which have proved to be a great success with manufacturers and retailers of household electrical appliances, and users. This success is explained notably by the attractive appearance of these hobs and by the ease of cleaning them.

A glass-ceramic is based on glass, so-called precursor glass (or green glass), the specific chemical composition of which makes it possible to cause controlled crystallization by appropriate heat treatments, called ceramizing treatments. This specific, partly crystallized structure endows the glass-ceramic with unique properties.

There are now various types of ceramic hobs, each variant being the result of extensive research and numerous tests, since it is very difficult to make changes to these hobs and/or to their method of production without the risk of an unfavorable effect on the required properties: in particular, to be able to be used as a hot plate, a ceramic hob must generally display transmission at the wavelengths of the visible region that is both low enough to mask at least part of the underlying heating elements at rest and high enough so that, depending on the type (radiant heating, heating by induction, etc.), the user will be able to detect the heating elements visually when in operation for reasons of safety; it must also have high transmission at the wavelengths of the infrared region, notably in the case of radiant hobs. Ceramic hobs must also have sufficient mechanical strength such as is required in their field of use. In particular, for use as a hot plate in the field of domestic electrical appliances, a ceramic hob must have good compressive and impact strength (as defined for example in standard EN 60335-2-6) (supporting and dropping of utensils, etc.).

The most widely used ceramic hobs are of a dark color, in particular black or brown or orange-brown. With a low coefficient of transmission below 600 nm, these hobs in particular allow red elements to be seen, such as the heating elements at high temperature, or illuminated displays based on red-colored monochromatic LEDs. Clearer and/or transparent ceramic hobs (such as the KeraVision or KeraResin ceramic hobs marketed by the company EuroKera), if necessary combined with opacifying coatings, or with filters or layers with a filter effect (such as Keraspectrum ceramic hobs) also exist, allowing other colors to be displayed.

The light sources used with ceramic hobs generally make it possible to indicate controls or heating zones, display data, and create or reveal decorative effects, etc. The light sources used are generally installed under the hob, so as to be able to illuminate patterns (for example a pictogram or a symbol indicating operation of the heating zones, etc.). These sources may for example be formed from one or more light-emitting diodes (LEDs) inserted under the hob on a support or box. To allow illumination of patterns, one or more clear spaces may be provided, for example in one or more optional opacifying layers coating the hob, and/or on the system (such as a box) for inserting the light sources. As the sources may be of considerable intensity, it is known to insert a diffusing interposed element (for example in the form of a disk or pellet), traditionally of polymer or ceramic, between the source and the hob at the level of the patterns or zones that may be illuminated to avoid dazzling the user. These elements, obtained from the electronics industry, are mass-produced, so it is difficult to produce special shapes, especially for small production runs, and moreover the mounting and fixing of these elements may prove complex and expensive. Moreover, certain materials (especially polymers) cannot be used in certain zones subjected to high temperature, such as the heating zones.

Besides not dazzling the user, it is also desirable to obtain illuminated patterns that have uniform lighting on their entire surface, and it is also desirable that these patterns, notably those of small size, should appear with sufficient clarity and contrast and can be easily located. It is also desirable that the light does not diffuse on the contours of the pattern, which in this case might not appear clearly, and for example when using a hob that has pins on the lower face, it is advisable to prevent these pins being visible at the level of the patterns through transparency and might induce optical distortion of the light from the light source.

The present invention has therefore sought a solution that is simple to implement, strong and durable, economical, efficient, and flexible enough to allow adjustments, notably as a function of the dimensions and shape of the zones to be illuminated and/or certain optical adjustments if applicable (transmission, etc.), to obtain patterns or illuminated displays on glass-ceramic articles in any desired zone (including optional heating zones), this solution also making it possible to preserve the clarity of the contours of the illuminated patterns appearing on the upper face of the glass-ceramic when they are illuminated by one or more light sources notably located on the lower face of the glass-ceramic, and obtain uniform illumination on the whole surface of the patterns, while avoiding dazzling the user and visibility of elements located on the lower face of the glass-ceramic or any effect of distortion caused by these elements.

This aim is achieved by the glass-ceramic article (or product) according to the invention, intended in particular to be used with (notably to cover or receive) at least one light source and/or at least one heating element, said article comprising at least one substrate, such as a plate, made of glass-ceramic, and having at least one zone that is illuminated or is to be illuminated, said substrate being coated facing said zone with paint formed from at least one silicone resin and pigment(s), the proportion of pigment(s) being greater than or equal to 1 wt % and below 10 wt % of the paint.

"Illuminated" zone (or lit zone) means a zone that is to be illuminated (in particular a display zone), i.e. a zone intended to be illuminated on activation of, for example, a light source and/or a heating element, even if this activation is occasional, and this zone (intended to be illuminated by a light source) may in particular be a zone for displaying information (for example a zone indicating with a symbol or pictogram, or with words, etc., whether or not one or more heating zones is/are in operation). This zone comprises for example at least one illuminated pattern, said pattern and/or said zone being in particular delimited (or intended to be delimited) by one or more clear spaces, made for example in a coating of the substrate or in an element that is to be fitted on the substrate (for example on a box bearing the light source or light sources provided for lighting this zone).

Coating of ceramic hobs with layers of the paint type is already known, but these are generally opacifying layers with a low level of transmission intended to obscure the underlying elements placed under the glass-ceramic, and moreover most of the paints are not suitable for coating zones facing the heating zones (normally owing to their lower heat resistance compared to enamel coatings). Note that the terms "under", "above", "upper face", "lower face", etc. describe the positioning relative to the glass-ceramic substrate considered in its position of use (the upper face, in the case of a hot plate, being that seen by the user, the lower or "inner" face being the opposite face, usually not seen by the user and turned toward the heating zones).

The paint used in the present invention combines an advantageous silicone resin and an unusually low proportion of pigments, for coating zones facing the illuminated zones, the composition developed according to the invention being usable in any zone of the glass-ceramic substrate, even when these zones are subjected to high temperatures and/or strong lighting, and makes it possible to obtain, unusually and unexpectedly, both sufficient, uniform light transmission on the zone concerned, and at the same time a high level of diffusion preventing dazzling of the user, these two properties generally being contradictory (a high level of diffusion generally being associated with low transmission, and vice versa). The level of light transmission obtained for the paint coating according to the invention is in particular greater than 30% and its level of diffusion is at the same time greater than 90%, as will be explained again later.

We also observe good adhesion of the paint to the substrate or to any adjacent layer present if necessary on the substrate (notably a layer of opacifying paint having clear spaces forming the patterns to be lit up), this paint moreover having good scratch resistance.

The solution according to the present invention makes it possible to obtain, simply and economically, without any complex operations (the layer of paint notably being deposited advantageously and simply by screen printing), durably and with good flexibility, illuminated patterns or displays on glass-ceramic articles in any desired zone, with illuminated patterns with clean contours, uniformly lit on their entire surface, without risk of dazzling the user, and without any annoying visibility or effect of distortion due to underlying elements.

The article according to the invention may be a hot plate or any glass-ceramic article having a display or at least one illuminated zone of a functional or decorative character, such as a glass-ceramic work surface, or even perhaps a system mainly for purposes of display (decorative and/or functional). In its commonest application, the article according to the invention is intended to serve as a hot plate, this plate generally being intended to be integrated in a hob or stove also comprising heating elements, for example radiant or halogen heaters or elements for induction heating. In another advantageous application, the article according to the invention is a work surface with various displays, and without necessarily cooking zones.

The article according to the invention comprises, or is formed of, at least one glass-ceramic substrate. Preferably, this substrate (or the article itself if it is only formed of the substrate) is a plate, notably intended to cover or receive at least one light source and/or heating element. This substrate (or this plate, respectively) is generally of a geometric shape, in particular rectangular, or square, or circular or oval, etc., and generally has an "upper" or "outer" face (face that is visible or facing the user) in the position of use, another "lower" or "inner" face (generally hidden, for example in a rack or cabinet) in the position of use, and an edge (or thin edge or ply). The upper face is generally flat and smooth but may also have at least one zone in relief and/or at least one hollowed zone and/or at least one opening and/or beveled edges (these shapes having been added during manufacture of the substrate, for example by rolling or caving-in or pressing, etc., or having been added later), etc., these variations of shape advantageously constituting continuous variations of the plate (without change of materials or connectors). The lower face is preferably flat and smooth according to the present invention but could if necessary also have structured elements.

The thickness of the glass-ceramic substrate is generally at least 2 mm, notably at least 2.5 mm, and is advantageously less than 15 mm, and is in particular of the order of 3 to 15 mm, notably from 3 to 6 mm. The substrate is preferably a flat or almost flat plate (in particular with a deflection below 0.1% of the diagonal of the plate, and preferably of the order of zero).

The substrate may be based on any glass-ceramic, this substrate advantageously having a zero or almost zero CTE, in particular lower (in absolute value) than $30 \cdot 10^{-7}$ $K^{-1}$ between 20 and 300° C., notably below $15 \cdot 10^{-7}$ $K^{-1}$, or even below $5 \cdot 10^{-7}$ $K^{-1}$ between 20 and 300° C.

Preferably, a substrate of dark appearance is used, with low transmission and diffusion, notably based on any glass-ceramic having, intrinsically, light transmission from 0.8% to 40%, in particular from 0.8 to 5%, notably from 0.8 to 2%, and optical transmission (determined in a known manner as the ratio of the transmitted intensity to the incident intensity at a given wavelength) of at least 2.5% for a wavelength of 625 nm, which is within the visible region. "Intrinsically" means that the plate possesses said transmission in itself, without the presence of any coating. In particular, a substrate of black or brown appearance is used, making it possible, in combination with light sources placed underneath, to display illuminated zones or decorative effects, while masking any underlying elements. In particular, it may be based on a black glass-ceramic comprising crystals of β-quartz structure within a residual vitreous phase, the absolute value of its coefficient of expansion advantageously being less than or equal to $15.10^{-7} K^{-1}$, or even $5.10^{-7} K^{-1}$, such as the glass-ceramic of the hobs marketed under the name Kerablack+ by the company Eurokera. In particular, it may be an arsenic-refined glass-ceramic with a composition as described in patent application EP0437228 or U.S. Pat. No. 5,070,045 or FR2657079, or a tin-refined glass-ceramic, having a level of arsenic oxides below 0.2%, for example with a composition as described in patent application WO 2012/156444, or else refined with sulfide(s) as described in patent application WO2008053110.

The substrate forming the article according to the invention is provided (or equipped or coated), facing the zone to be illuminated, with paint (or a paint coating or one or more layers of paint), the paint being formed of (or based on) at least one silicone resin and a low proportion of pigment(s) according to the invention. The silicone resin or resins (or polysiloxanes) used (notably being in the form of polymer(s), monomer(s) and/or oligomer(s), crosslinkable if applicable) may notably be selected from the silicone resins modified by incorporating at least one radical selected from the following radicals: alkyl (which may optionally comprise an aromatic ring), phenyl (or other radical from the aryl family), alkenyl, vinyl, allyl, alkynyl. Advantageously, the silicone resin or resins in the paint are resins that are not functionalized by (or are devoid of) at least the following functions or functional groups: halogen, epoxy, polyester. The silicone resin or resins used for the paint may notably be one or more polysiloxane or silsesquioxane resins selected from the polymethylsiloxanes, polydimethylsiloxanes, polyphenylmethylsiloxanes, polydiphenylsiloxanes, dimethylsiloxane/diphenylsiloxane copolymers, etc.

Preferably the proportion of silicone resin(s) in the paint composition used according to the invention is at least 25 wt % of the paint (total paint composition as deposited, also including, if applicable, a solvent, an inorganic filler, additives, etc.), and generally at least 30 to 43 wt % of the paint, its proportion relative to the dry extract of the paint being at least 40 wt %.

As indicated above, the paint used according to the invention is also formed from pigment(s), the proportion of pigment(s) being greater than or equal to 1 wt % and below 10 wt % of the paint (total paint composition as deposited, also including, if applicable, a solvent, an inorganic filler, additives, etc.), and is preferably from 2 to 6 wt % of the paint, in particular from 2 to 4 wt % of the paint.

The pigments used for making the paint are preferably inorganic pigments. They are in particular selected from the pigments based on metal oxides, such as titanium oxides, chromium oxides, copper oxides, iron oxides, cobalt oxides, nickel oxides, zinc oxides, manganese oxides, cerium oxides, etc. White pigments, in particular and advantageously pigments based on titanium oxides $TiO_2$ (such as those marketed by the company Kemira under the reference Kemira 300 or those marketed by the company Chemours under the reference TiPure R900, etc.), are preferably used as pigments, in particular as single pigments. The pigments selected in the present invention preferably exclude the so-called "effect" pigments, i.e. provided with effect coating(s), in particular with a reflective effect, as the effect pigments may have an undesirable effect on the required optical properties.

The pigments are notably dissolved or dispersed in the aforementioned silicone resin or resins (serving as binder; the term "silicone binder" may also be used to denote silicone resins) and/or in an added medium (as stated hereunder). The pigments are generally in the form of powder before being suspended or dispersed in a binder or medium. In the present invention the pigments are preferably selected so that at least 50%, and preferably at least 75%, or even at least 90%, of the particles of (or forming these) pigments have a dimension or size ranging from 0.1 to 10 µm, regardless of the shape of these particles.

The size of a particle is its equivalent diameter, i.e. the diameter of the sphere that would behave identically during granulometric analysis of the particles (or powder formed from said particles) forming the pigments in question, the granulometric distribution (set of particle sizes) being measured in particular by laser granulometry. Advantageously, at least 50% (by number), and preferably at least 75%, or even at least 90%, of the (particles of) pigments present in the ink used in the present invention have a size from 0.1 to 10 µm, in particular from 0.1 to 1 µm (notably for white pigments based on $TiO_2$).

The aforementioned silicone resin or resins notably coat the pigment powder in the paint and allow bulk agglomeration of the particles after drying to form the solid paint layer. If applicable, the paint, notably in its form ready for deposition, also contains, besides the silicone resin or resins binding the pigments, at least one (other) medium or solvent (or diluent, if applicable), forming part of (or added with) the silicone resin as added to the paint composition and/or forming part of (or added to) the paint, this solvent allowing adjustment to the desired viscosity for application on the substrate and allowing preliminary bonding of the paint to the substrate. For example white spirit (or heavy naphtha), xylene, turpentine oil, etc., may be used as solvent. The proportion of solvent in the paint during deposition is generally of the order of 20 to 40 wt % of the paint, the solvent then being removed to obtain the final layer (said removal mainly taking place during drying).

Advantageously, the paint used according to the invention is devoid of water or of aqueous solvent, notably for better application.

In most cases the paint also comprises one or more inorganic or mineral fillers (other than pigments, and that do not melt, notably during baking), advantageously insoluble, notably having a role of reinforcement or also contributing to the thermal stability of the whole (these fillers, in contrast to pigments, only giving slight opacity), for example one or more fillers formed from calcium and/or magnesium carbonates, and/or from barium sulfate, from silica or silicates, in particular from kaolin, talc, etc., generally at a level of at least 20 wt % and preferably not exceeding 40 wt % of the paint, to ensure its cohesion or mechanical reinforcement, and preferably at levels from 20 to 35 wt % of the paint. Preferably, the paint notably comprises talc as mineral fillers notably for good thermal stability of the paint.

The paint may also optionally include other types of components, such as one or more additives (notably wetting agents(s), stabilizer(s), dispersant(s), surfactant(s), pH adjuster(s) or viscosity adjuster(s), biocide(s), antifoaming agent(s), antioxidant(s), drying agent, etc.).

In contrast to an enamel composition, the paint composition according to the invention is devoid of sintered glass or of components that together are able to form a vitreous matrix. On deposition, the paint composition according to the invention is in the form of a dispersion and is also advantageously devoid of silica gel or of colloidal silica for better application of the composition (in contrast to a hydrolyzate or a sol-gel, it is notably simpler to form and use).

In a preferred embodiment according to the invention, the paint according to the invention has the following composition (or comprises the following constituents in the range defined below, inclusive), the proportions being expressed as percentages by weight (relative to the total weight of the paint composition ready for deposition):

| | |
|---|---|
| silicone resin(s) | 25-45%, preferably 30-45% |
| pigment(s) (in particular white) | 1-10%, preferably 2-6% |
| filler(s) (in particular talc) | 20-40%, preferably 20-35% |
| solvent(s) | 20-40%, preferably 20-35% |

Once it is solid, the paint coating is mainly formed of the aforementioned silicone resin or resins, fillers and pigments. The paint composition is predominantly inorganic/mineral, i.e. it comprises at least 50 wt % of inorganic components relative to the dry extract of the paint.

Before deposition, the paint is generally in the form of a stable liquid-solid mixture of a pasty consistency, the viscosity on deposition of the paint preferably being between 1500 and 3000, in particular between 1600 and 2100 mPa·s.

The paint may be formed directly by mixing these constituents in the required proportions, the viscosity being adjusted if necessary by adding solvent, or else may be formed from an existing opacifying paint composition, by diluting said paint using a transparent paint based on the same constituents, apart from the pigments. The paint used according to the invention is preferably white, but may if necessary be colored (by choosing colored pigments instead of white), in particular to change the perceived color of the lighting.

The paint is preferably applied (in one or more layers, preferably one layer), quickly and easily, by screen printing (notably in the form of solid tone(s)) on the glass-ceramic substrate (this deposition being carried out after optional ceramizing of the substrate), already partly coated or not coated (as stated hereunder), advantageously on the lower face of said substrate, in the appropriate zones (facing/opposite the illuminated zone or zones), delimited in particular by clear spaces as indicated hereunder, and on the whole surface delimited by each of said clear spaces or on the whole surface facing/opposite said illuminated zones, deposition by screen printing notably making it possible to obtain patterns that are variable and accurate.

Preferably, the screen printing gauze (or screen) used, consisting for example of fabrics of polyester or polyamide threads, is selected so as to have a number of threads per cm between 43 and 120 threads per cm, thus making it possible to obtain a particularly suitable thickness and definition of the paint coating.

The thickness of the final paint coating is thus preferably less than 25 µm, in particular between 2 and 20 µm, notably between 4 and 15 µm, or even between 6 and 15 µm.

The paint once deposited is dried and/or left to harden or baked, and baking may be done with the other optional layers of paint present. The paint may notably be baked (again) on the ceramized substrate, at temperatures of the order of 350 to 500° C., the final paint coating obtained after drying and/or hardening and/or baking forming a polymer-based layer.

It may be observed that the paint selected has good adhesion on the glass-ceramic material (without requiring pretreatment of the support and/or the use of an adhesion promoter, a keying coat or a primer) and does not weaken the glass-ceramic substrate mechanically (notably in contrast to an enamel).

It can cover zones of varying shape while respecting the constraints, notably thermal and mechanical, relating to the proposed preferred application (decorated plates subjected to high temperatures, such as cooking hobs), and in an economical, simple and efficient manner, the coating developed having good resistance (in particular mechanical, thermal and/or to abrasion) and good durability.

The coated article notably has good thermal stability compatible with the use of various types of heating systems, and does not pose any problems of maintenance, scratching or abrasion.

Advantageously, the paint is resistant to high temperatures. In particular, its degradation temperature is above 350° C., in particular between 350° C. and 700° C., Moreover, the paint as selected, combined with the glass-ceramic, allows sufficient masking of the underlying elements but without preventing their visual detection when in operation, and without risk of dazzling the user while allowing sufficient, uniform lighting of the illuminated zones.

The paint, or the paint coating, as deposited, both semi-transparent and diffusing, in particular has light transmission LT above 30%, preferably above 38%, notably above 40%, and even up to 60%, and its level of diffusion is at the same time greater than 90%, in particular greater than or equal to 99%, and this level may be up to 100%.

Optical measurements of the paint are performed according to standard EN 410 on a substrate coated with said paint whose optical characteristics have to be determined, preferably a transparent or translucent substrate provided with said paint, by calibrating the spectrophotometer with the bare substrate (without the layer of paint, the layer of paint being removed or the substrate being examined in a zone not coated with said layer, or the same substrate without paint coating being used), and then carrying out the measurement on the substrate coated with the paint, placing the paint on the side with the incident light beam, the spectrum thus obtained being the spectrum of the coating alone.

The light transmission $L_T$ (of the paint, or of other coatings, measured in the same way as for the layer of paint, or of the substrate, or of the coated substrate) is measured according to standard EN 410 using the D65 illuminant, and is the total transmission (notably integrated in the visible region and weighted by the curve of sensitivity of the human eye), taking into account both the direct transmission and any diffuse transmission, measurement being performed for example using a spectrophotometer equipped with an integrating sphere (in particular with the spectrophotometer marketed by the company Perkin Elmer under the reference Lambda 950).

The level of light diffusion is defined, in the context of the invention, as the ratio of the diffuse transmission to the total transmission using the D65 illuminant, this level being evaluated for example using the spectrophotometer equipped with an integrating sphere used for the measurements of light transmission.

As indicated above, the paint selected according to the invention covers the zone or zones facing the illuminated zone or zones, these zones generally being delimited by clear spaces.

In particular, the glass-ceramic substrate may comprise at least one coating (for example of enamel, notably on the upper face, or of paint, in particular on the lower face) that is opacifying (or an obscuring coating or opacifying layer), in particular with light transmission LT below 0.5%, covering the substrate and within which at least one clear space is made in the shape of the pattern or of the illuminated zone to be produced, the paint being deposited at the places of the clear space or spaces before and/or after depositing said opacifying coating.

The clear space or spaces are for example made by masking the zone or zones in question during deposition of the opacifying coating using a mask, which is removed after deposition, or for example by blocking the openings of the screen-printing screen serving for deposition of the opacifying coating in the zone or zones in question, or by precisely targeting the zones to be coated with the opacifying coating, etc. The clear space or spaces may notably have the form of pattern(s), letter(s), symbol(s), image(s), photograph(s), pictograph(s), geometric figure(s), drawing(s), etc.

Alternatively, the illuminated zone or zones may be delimited by clear spaces made in a device or mask applied after depositing the paint on the glass-ceramic substrate (for example in a box for inserting the light sources).

The paint according to the invention is applied facing each clear space, the light emitted by the light source or light sources passing through this diffusing zone before passing through the glass-ceramic substrate, giving an illuminated pattern, the paint preferably being on the lower face of the glass-ceramic, between the zone or zones to be illuminated and the respective light source or sources that are to illuminate said zone or zones, the paint notably allowing extraction of the radiation emitted by the source or sources toward the desired illuminated zone. The paint coating, applied in each zone or clear space in question, is in particular of the same shape and/or dimension (or approximately of the same shape and/or dimension) as the clear spaces in which it is applied without it being necessary moreover to align the two zones perfectly, and/or overflows onto the opacifying coating (for example covers some millimeters of said coating around the clear space or spaces), the light emitted by the light source, concentrated at the level of the pattern, diffusing only in the clear space and the contours of the pattern obtained being particularly clean but without making the elements located under the pattern perceptible.

In an advantageous embodiment according to the invention, the substrate according to the invention may comprise two opacifying coatings, or opacifying layers, in particular two layers of opacifying paint, one of the opacifying coatings, deposited under the lower face of the glass-ceramic substrate, having one or more clear spaces delimiting one or more zones to be illuminated, the paint according to the invention being applied in said clear space or spaces, and the second coating covering the edges of the diffusing paint according to the invention, the paint according to the invention being as it were sandwiched between the two opacifying coatings, this embodiment notably giving better opacity of the zones around the clear spaces.

In another advantageous embodiment according to the invention (alternative to or cumulative with the preceding embodiment), the substrate according to the invention comprises at least one colored layer or filter on (between the paint and the opposite facing light source) or under (between the paint and the glass-ceramic substrate) the coating of diffusing paint according to the invention, and/or said paint is colored. Preferably, the colored layer or filter is located on the paint coating according to the invention, or else between the layer of paint and the opposite facing light source (in other words, the paint according to the invention is coated with at least one colored layer or filter).

If applicable, the substrate may comprise one or more additional coatings, in particular localized (for example enamel on the upper face to form simple patterns or logos).

The article according to the invention also comprises at least one or more light sources and/or one or more heating elements (such as one or more radiant elements or halogen elements and/or one or more atmospheric gas burners and/or one or more means for heating by induction) notably causing, on activation, lighting of the illuminated zones provided, and positioned on the lower face of the substrate, notably so as to illuminate the corresponding illuminated zones. The source or sources may be integrated in/coupled to one or more structure(s) of the display type (for example with so-called "7-segment" light-emitting diodes), to a touch-sensitive electronic control panel with digital display, etc. The light sources are advantageously formed by light-emitting diodes, with varying spacing, optionally combined with one or more optical waveguides. Diodes are advantageous in the present invention notably in terms of overall dimensions, efficiency, durability and resistance to the surrounding conditions (heat etc.).

The diodes may be carried by a support or strip or base, and said base may have a (flat or inclined) surface that is treated and/or made reflective for better luminous efficiency.

Assembly of the source or sources (to the plate or to another component of the article, for example the control panel) may be done by welding, clipping, gluing, etc., if applicable via another element; for example, the diodes, welded on a support itself housed at the bottom of a metal profile, may be mounted by clipping or gluing of the profile. The positioning of the source or sources (notably relative to the plate) is adjusted to allow display through the glass-ceramic.

The sources, as well as their supply and actuation, may be dissociated or not, so as to allow simultaneous or separate lighting of the desired illuminated zones as required.

The light source or sources may be triggered by any control system, for example by electromechanical button(s) or touch-sensitive areas, in particular the light source or light sources may be actuated by means of a capacitive mechanism by positioning a finger on the glass-ceramic at the location of (or on) the appropriate activation zone, this activation zone being indicated on the surface of the glass-ceramic and corresponding in particular to an illuminated zone according to the invention. Touching with the finger (conductor of electricity) changes the capacitance, electrical charges being transferred to it, the change in capacitance being detected by measurement systems, the latter notably triggering activation of the associated light source or sources.

Preferably, the article according to the invention comprises at least one illuminated zone intended to show whether at least one heating zone is on or off (zone called ON/OFF zone, the clear space delineating the pattern to be illuminated in said zone being for example in the form of a pictogram symbolizing switch-on). The article according to the invention thus preferably comprises an opacifying coating (such as enamel deposited for example on the upper face in said zone, or paint deposited for example on the lower face of the substrate), this coating being localized (for example in the form of a disk) or on the greater part of the face in question of the substrate, and a clear space being made in this opacifying coating according to the pattern selected (such as the aforementioned ON/OFF pattern). This pattern indicates for example that it is the ON/OFF control key, located for example on the control panel, this key being activated for example by a capacitive mechanism by putting a finger on said key on the glass-ceramic. Activation of this key switches on an LED that emits light (for example colored red). The light emitted by this LED is diffused by the paint according to the invention located under the glass-ceramic above the light source, the paint coating in this zone being for example of cylindrical shape (or circular or disk-shaped, with diameter corresponding for example to that of the clear space), with the red light appearing (on top of the glass-ceramic substrate) at the level of the cleared zone.

The article may optionally comprise, in combination with the light sources, at least one waveguide intended to propagate the light from one part of the article to another (in particular by total internal reflection or by metallic reflection), the source or sources interacting with the guide or guides and emitting/being coupled for example by the cut edge or thin edge of the associated guide or guides. The guide or guides are advantageously clear or transparent, and are generally positioned (assembled after being designed separately) on the lower face of the substrate. They may be organic and/or plastic (for example of polycarbonate or polymethyl methacrylate PMMA), or mineral, in particular made of glass. They may be fastened to the substrate, or to a support on which the article is mounted, by gluing and/or clipping, or by encapsulation, etc. The waveguide allows, among other things, better conduction of light to the desired illuminated zones, especially when the substrate is of a dark color. If applicable, the geometry and the roughness of the edge of a waveguide may also be adjusted to allow local, controlled extraction of the light.

The article according to the invention may comprise, if applicable, other elements and/or layers besides the substrate provided with the aforementioned coatings. For example, in the case of a cooking module or hob, the article may be provided with (or combined with) additional functional or decorative element(s) (frame, connector(s), cable(s), control element(s)), etc. It may comprise various functional and/or decorative coatings, based on enamel, paint, etc. (for example, one of the faces of the substrate may comprise a layer of at least one enamel, for example decorative, or for masking, etc.). The substrate or the article may also be mounted on an appliance, inside which one or more heating elements are arranged. The invention thus relates to all appliances (or devices) for cooking and/or for maintaining at high temperature comprising at least one article according to the invention (for example in the form of a plate), for example cookers, built-in hobs, etc., and the article may comprise various types of heating elements (gas, radiant, induction, etc.). Furthermore, the invention is not limited to the manufacture of hot plates for cookers or hobs. The articles according to the invention may also be, as stated above, other articles (work surfaces, consoles, central island, etc.).

As already mentioned, the present invention also relates to the method of manufacturing the articles according to the invention, in which the glass-ceramic substrate is coated facing at least one illuminated zone with paint formed from at least one silicone resin and pigment(s), the proportion of pigment(s) being greater than or equal to 1% and below 10 wt % of the paint. As already indicated above, the paint is applied on the glass-ceramic substrate obtained previously by ceramizing.

For the record, glass-ceramic plates are generally manufactured as follows: glass of the composition selected for forming the glass-ceramic is melted in a melting furnace, then the molten glass is rolled into a strip or standard sheet by passing the molten glass between rolling rollers, and the glass strip is cut to the desired dimensions. The plates thus cut are then ceramized in a manner known per se, ceramizing consisting of baking the plates following the thermal profile selected for transforming the glass into the polycrystalline material called "glass-ceramic", which has a zero or almost zero coefficient of expansion, and resistance to thermal shock of up to 700° C. Ceramizing generally comprises a step of gradually increasing the temperature to the nucleation region, generally located near the region of transformation of the glass, a step of passing through the nucleation range in several minutes, gradually increasing the temperature again to the temperature of the ceramizing stage, maintaining the temperature of the ceramizing stage for several minutes and then rapid cooling to room temperature.

The paint may be applied by any suitable quick technique notably making it possible to produce solid tones, such as deposition by brush, by squeegee, by spraying, electrostatic deposition, dipping, curtain deposition, deposition by screen printing, sprayer, etc., application preferably being done by screen printing, said application being followed if necessary by drying (air drying or drying by heat treatment), for example by infrared heating or in a stove, notably between 100 and 250° C., so as to evaporate at least partly the solvent present if applicable, to fix the coating and allow the article to be handled, the substrate coated with the paint then generally undergoing heat treatment in order to effect baking/crosslinking of the paint and to remove any solvent residues if applicable. Since baking of the substrate provided with the paint coating is carried out separately from the operation of ceramizing the substrate (it is then said to be a method with annealing or repeat baking), this baking may notably be carried out at a suitable temperature for baking the paint, this temperature range notably being between 80 and 500° C. for the present invention.

If applicable, the method also comprises an operation of cutting (generally before ceramizing), for example by water jet, mechanical scribing with a wheel, etc., followed by a shaping operation (grinding, beveling, etc.).

The present invention and its advantages will be better understood on reading the following example, given purely for purposes of illustration, and nonlimiting.

In this example, the article produced is a flat cooking module comprising a translucent black glass-ceramic plate (substrate), marketed under the reference KeraBlack+ or KeraVision by the company Eurokera, this plate having a smooth upper face and a smooth lower face, the article further comprising a light source fixed under the plate against the latter, this light source being a light-emitting diode (LED). Furthermore, screen printing is used for depositing, on the lower face of the plate, an opacifying paint consisting of 33 wt % of silicone binder, 26 wt % of talc, 26 wt % of a solvent based on xylene and white spirit and 15 wt % of black pigments based on graphite and lampblack, the thickness of the layer deposited being of the order of 15 µm. This deposit is made in the form of a solid tone, and a clear space in the form of a pictogram indicating activation is made in this deposit by means of corresponding masks in the screen-printing screen used during deposition. The pattern created indicates that it is a control zone (ON/OFF zone), activation of this zone taking place by a capacitive mechanism. The layer deposited is then dried at about 220° C.

In parallel, a composition of diffusing paint is produced, starting from an opaque white paint composition consisting of 30 wt % of silicone binder (half being silicone resin marketed under the reference 249 by the company Dow Corning and the other half being silicone resin marketed under the reference P850 by the company Bayer, 25 wt % of talc, 25 wt % of a solvent based on xylene and white spirit marketed under the reference Solvesso 100 by the company ExxonMobile and 20 wt % of white pigments based on $TiO_2$ marketed by the company Kemira under the reference Kemira 300, this opaque white paint composition then being diluted with a second paint, this time transparent and consisting of the same elements as the opaque white paint apart from the pigments, i.e. 37.5 wt % of silicone binder, 31.25 wt % of talc, 31.25 wt % of solvent, in proportions of 20 parts by weight of opacifying paint to 80 parts by weight of transparent paint. Paint is obtained having the following composition: 36 wt % of silicone binder, 30 wt % of talc, 30 wt % of solvent and 4 wt % of white pigments based on $TiO_2$, these pigments having a particle size (for at least 90% of the particles of these pigments) between 0.1 and 1 µm. The two paints are mixed and the viscosity is adjusted if necessary so as to be between 1600 and 2100 mPa·s (the viscosity being measured using a Brookfield DV-II+ Pro reference instrument marketed by the company Brookfield), if necessary adding Solvesso 100 reference solvent if the viscosity is too high, or a filler or a thickener in the form of silica of the Aerosil reference marketed by the company Evonik if the viscosity is too low.

The paint obtained is then applied by screen printing in the clear space made under the glass-ceramic plate and then dried at 205° C., all the paint layers then being baked at around 450° C. Deposition is carried out using a number 90 screen-printing gauze, i.e. with 90 threads per cm, the deposit made using a number 32 gauze being too coarse in comparison, and that made using a number 43 gauze being too thick and too opaque. Deposition is carried out with overflowing by 2 to 5 cm on the clear space left in the layer of opacifying paint where the lighting will be positioned in the final assembly.

The thickness of the layer of diffusing paint after baking is 10 μm. Its light transmission is also measured by coating (in the same way as before) a glass-ceramic substrate, this time transparent, as indicated above in the method for measuring the light transmission of paint. The light transmission obtained for the layer of diffusing paint is 46.2%, that for the black substrate of the present example coated with said layer of paint being for its part 1.4%. The level of light diffusion for the layer of diffusing paint (on a transparent substrate) is in parallel 99%.

These values are close to those obtained (in place of the diffusing paint) with a diffusing pellet of polymer (for example of polyvinyl chloride (PVC)) with a thickness of 0.2 to 0.60 mm, which is glued under the glass-ceramic or on the light source (this source may if necessary be encapsulated in PVC), but the mounting of this pellet is more complex and the lighting obtained is less uniform than with the paint according to the invention, an intensity peak notably being observed with this pellet above the hot spot or light beam of the LED located underneath.

Also for comparison, the light transmission obtained for the layer of opacifying paint (undiluted, with a proportion of pigments of 20 wt %) is 19.9%, that for the black substrate of the present example coated with said layer of opacifying paint being for its part of the order of 0%, these light transmissions (as well as that obtained for the same paint diluted to give a proportion of pigments of 10 wt %) proving insufficient to obtain, in combination with the level of diffusion obtained (of the order of 95% in these two cases), adequate uniform lighting without dazzling the user.

An aging and thermal stability test was also carried out, simulating an accidental situation of forgetting a saucepan on an induction heating zone (the temperatures reached varying between 450° C. and 600° C. for some minutes to some tens of minutes), no coloration or degradation being observed on the diffusing paint according to the invention, in contrast to the opacifying paint, which undergoes discoloration on the lower face of the hob, the discoloration not, however, being visible on the upper face of the substrate, even when illuminated.

The diffusing paint deposited therefore has both good heat resistance allowing this paint to be used in all the zones of the induction hot plate, from the cold zones (control panel) to the hot zones (interior of the cooking zone), a suitable combination of maximum light transmission and diffusion, great ease of application and adjustment of the characteristics, and moderate cost.

The articles, in particular plates, according to the invention may notably be used advantageously for making a new range of hot plates for cookers or hobs or a new range of worktops, consoles, central islands, etc.

The invention claimed is:

1. A glass-ceramic article, said article comprising: at least one substrate made of glass-ceramic, and having at least one illuminated zone, said substrate being coated facing said zone with a paint comprising at least one silicone resin, pigment(s), filler(s), and solvent(s) in the following proportions expressed in percentages by weight:
    silicone resin(s) 25% to 45%;
    pigment(s) 1% to less than 10%;
    filler(s) 20% to 40%; and
    solvent(s) 20% to 40%.

2. The glass-ceramic article as claimed in claim 1, wherein the pigments are white pigments, the proportion of the pigment(s) being from 2 to 6 wt % of the paint, and wherein effect pigments are excluded from the paint.

3. The glass-ceramic article as claimed in claim 1, wherein at least 50% of particles of the pigment(s) have a size from 0.1 to 10 μm.

4. The glass-ceramic article as claimed in claim 1, wherein the filler(s) are one or more inorganic or mineral fillers.

5. The glass-ceramic article as claimed claim 1, wherein the silicone resin or resins are resins selected from silicone resins modified by incorporating at least one radical selected from the following radicals: alkyl, phenyl, alkenyl, vinyl, allyl, alkynyl and are not functionalized by at least the following functions or functional groups: halogen, epoxy, polyester.

6. The glass-ceramic article as claimed in claim 1, wherein the paint is devoid of water or of aqueous solvent.

7. The glass-ceramic article as claimed in claim 1, wherein the paint is devoid of sintered glass or of components that together are able to form a vitreous matrix.

8. The glass-ceramic article as claimed in claim 1, wherein the paint during deposition is in the form of a dispersion, and is devoid of silica gel or of colloidal silica.

9. The glass-ceramic article as claimed in claim 1, wherein the viscosity on deposition of the paint is between 1500 and 3000 mPa·s.

10. The glass-ceramic article as claimed in claim 1, wherein a thickness of the paint coating is less than 25 μm.

11. The glass-ceramic article as claimed in claim 1, wherein the paint forms a polymer-based layer.

12. The glass-ceramic article as claimed in claim 1, wherein the paint coating has a light transmission LT above 30%, and level of diffusion is greater than 90%.

13. The glass-ceramic article as claimed in claim 1, wherein the glass-ceramic substrate comprises at least one opacifying coating covering the substrate and within which at least one clear space is made in the shape of the pattern or of the illuminated zone to be produced, the paint being deposited at the places of the clear space or spaces.

14. The glass-ceramic article as claimed in claim 1, wherein the glass-ceramic substrate comprises:
    a first opacifying coating deposited under the lower face of the glass-ceramic substrate, having one or more clear spaces delimiting one or more zones to be illuminated; the paint being applied in said clear space or spaces; and
    a second opacifying coating covering the edges of the paint and the first opacifying coating.

15. The glass-ceramic article as claimed in claim 1, wherein the substrate comprises at least one colored layer or filter on or under the paint and/or wherein said paint is colored.

16. The glass-ceramic article as claimed in claim 1, wherein the substrate is of dark appearance, the substrate having a light transmission from 0.8% to 40%, and an optical transmission of at least 2.5% for a wavelength of 625 nm.

17. The glass-ceramic article as claimed in claim 1, wherein said article or said substrate is a hot plate or a work surface.

18. A method of manufacturing the glass-ceramic article as claimed in claim 1, the method comprising:
coating the glass-ceramic substrate with the paint formed from the at least one silicone resin, pigment(s), filler(s), and solvent(s).

19. The method as claimed in claim 18, wherein the paint is applied by screen printing on the glass-ceramic substrate, uncoated or already partly coated, facing the illuminated zone or zones, delimited by clear spaces and on the whole surface delimited by each of said clear spaces or on the whole surface facing said illuminated zones, and wherein the screen-printing gauze is selected so as to have a number of threads per cm between 43 and 120 threads per cm.

* * * * *